United States Patent Office 3,614,998
Patented Oct. 26, 1971

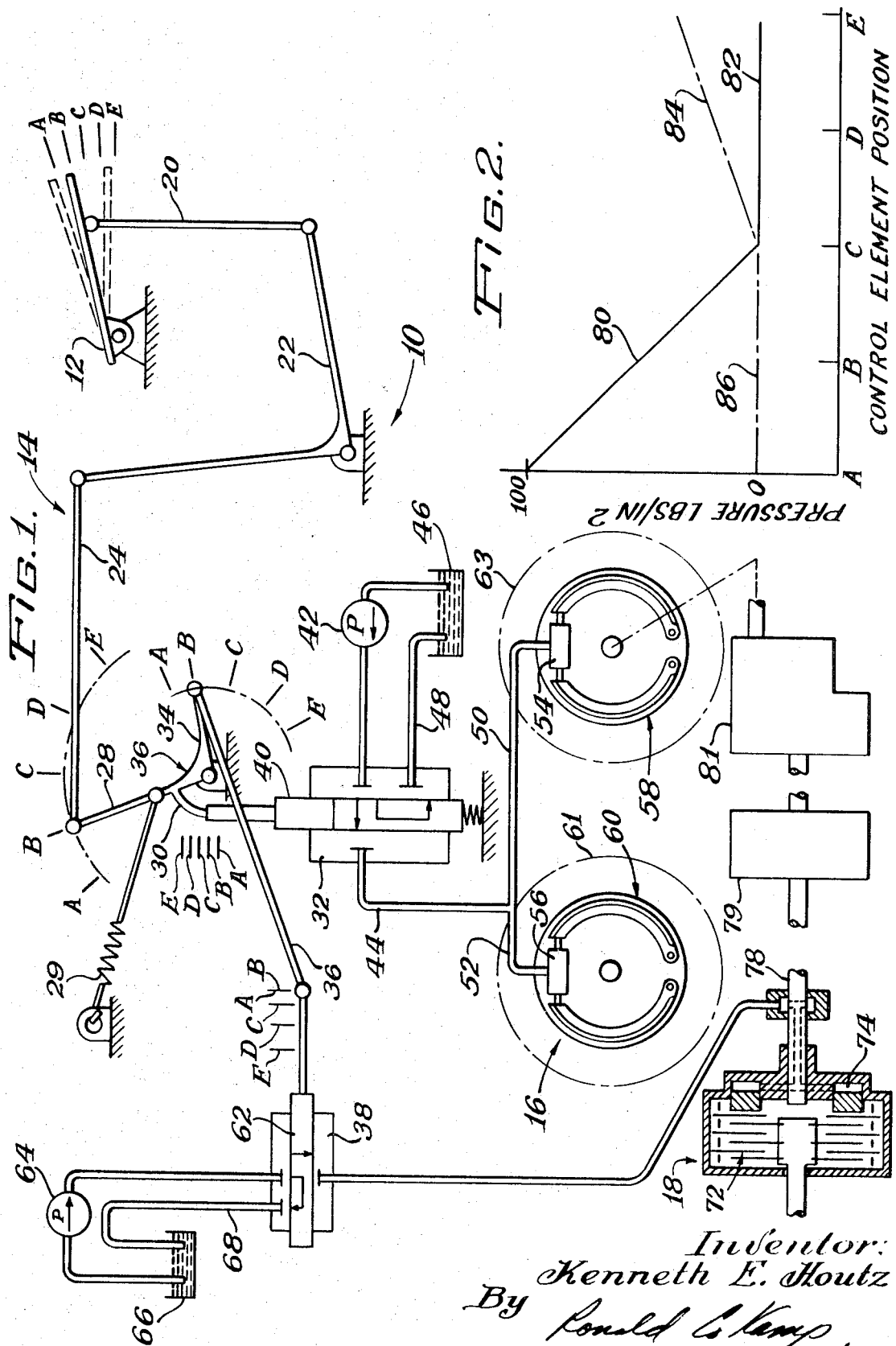

3,614,998
COMBINED CLUTCH AND BRAKE CONTROL SYSTEM FOR A VEHICLE
Kenneth E. Houtz, Streamwood, Ill., assignor to International Harvester Company, Chicago, Ill.
Continuation-in-part of application Ser. No. 860,105, Sept. 22, 1969, which is a continuation of application Ser. No. 664,347, Aug. 30, 1967. This application May 18, 1970, Ser. No. 38,093
Int. Cl. F16d 67/02
U.S. Cl. 192—13 R
6 Claims

ABSTRACT OF THE DISCLOSURE

A control system for a vehicle having hydraulically operated brake and clutch mechanisms. A single control element provides simultaneous modulation of the brake and clutch pressures within the range between full brake application with clutch release, and brake release with full clutch release, and brake release with full clutch application. The control system is designed to provide fail safe operation.

CROSS-REFERENCE TO PARENT APPLICATIONS

This application is a continuation-in-part of application Ser. No. 860,105 filed on Sept. 22, 1969, which application is in turn a continuation of application Ser. No. 664,347 filed on Aug. 30, 1967.

SUMMARY OF THE INVENTION

This invention relates to a control system for a vehicle and more particularly relates to a system providing simultaneous control of the vehicle brakes and drive train clutch by means of a simplified linkage arrangement.

Conventional construction vehicles, such as front-end tractor loaders, incorporate plural controls for the various operating devices on the vehicle. Separate controls are provided for the clutch, brakes, engine accelerator, transmission, and loader mechanism. Thus, the operator is faced with the difficulty of separately manipulating the various controls throughout repetitive work cycles. This adds to operator fatigue, increases the time required for work cycling, and adversely affects the work efficiency of the vehicle. Another disadvantage with conventional construction equipment is that engine speed is normally varied to control vehicle speed, and since the hydraulic system is also powered directly by the engine full hydraulic power may not be available when required, such as during slow vehicle speed when the boom must be elevated rapidly.

A modulated or power control clutch is often used in conjunction with a torque converter. The clutch is driven by an engine, governed to run at constant speed, and the output of the clutch is connected to drive the input of a torque converter, the output of the torque converter being connected with the input of a forward-reverse and change speed transmission. The amount of power and/or the speed of the vehicle is varied by the operator by means of a manually controlled valve which varies the pressure admitted to the clutch, the pressure determining how tightly the interleaved clutch plates are pressed together and, hence, the amount of slippage within the clutch. Under certain conditions, it is possible for the torque converter to, in effect, prevent disengagement of the clutch. That is, even though the operator has positioned his control means so that no pressure is present within the clutch, the viscous drag of lubricating and cooling oil between the interleaved clutch plates will cause power to be transmitted through the drive train and the vehicle will continue to be driven. This "run away" phenomenon generally occurs when the torque converter is being operated at a high speed ratio, i.e., when the ratio of output speed to input speed is about 0.9 or above. The problem is most pronounced on torque converters of the type having rotating housings and low torque multiplication characteristics. While it is possible to minimize or eliminate this tendency to "run away" by special design of the torque converter or incorporation of complex controls, either approach to a solution is expensive both from the standpoint of initial cost and maintenance thereof.

Applicant's invention provides a vehicle control system for use with a torque converter of any design and which is less expensive to construct and maintain. It also provides precise control of such a drive train and precludes "run away."

Applicant's invention also provides a vehicle control system having interconnected clutch and brake controls to obviate the disadvantages with existing control systems on construction vehicles. A single control element is provided for both the clutch and brake systems to simplify vehicle operation and increase the efficiency of the work cycle. The invention permits the operator to have a finer degree of control for vehicle movement as compared to conventional construction equipment.

The control system of the present invention may be utilized in a vehicle having an engine operated at full governed speed to produce substantially constant flow from the engine driven hydraulic pumps while still permitting the operator to control vehicle movement through a coordinated brake and clutch control system. The operator can achieve this vehicle control by manipulating a single control element which, according to its position, will modulate both power to the drive train and vehicle braking as required.

The invention also provides means to automatically apply the brakes and disconnect the clutch upon release of the control element.

DESCRIPTION OF THE DRAWINGS

FIG. 1 is a schematic diagram of a control system for a vehicle incorporating features of the present invention; and FIG. 2 is a graph for the present invention showing the relationship between brake and clutch control pressures as a function of control element position.

DESCRIPTION OF THE PREFERRED EMBODIMENT

Referring now to the drawings and particularly FIG. 1 a schematic diagram of the preferred control system of applicant's invention is illustrated generally at 10. Control system 10 comprises a control element 12, which may be a foot pedal manipulated by the operator, operatively connected with linkage arrangement 14 to simultaneously control vehicle brake system 16 and clutch system 18.

Control element or pedal 12 is manipulated throughout its range of travel between the extreme positions A and E. The full line illustration of element 12 at position B is selected as a typical operating position within the range of control element travel. Incremental movement of the control element between its extreme positions is translated to the clutch, and brake controls by means of linkage arrangement 14 which comprises link 20, motion transfer lever 22, link 24, and operating lever 26. Operating lever 26 is provided with an arm 28 having a projecting cam 30 for operating the brake control valve 32, and an arm 34 connected with link 36 for operating clutch control valve 38. The relative positions for the arms 28 and 34, cam 30, and link 36 are indicated in FIG. 1 for each of the control element positions A through E.

Brake control valve 32 is conventional and comprises a spool 40 axially slidable within the valve housing between position A, in which fluid under pressure is directed from hydraulic pump 42 into conduit 44, and positions C, D, and E in which the entire flow from pump 42 is returned to reservoir 46 through conduit 48. In the intermediate positions between A and C valve 32 directs fluid into conduit 44 with a decreasing pressure as a direct function of cam 30 movement. Fluid from conduit 44 is directed into branch conduit 50 and 52 to actuator cylinders 54 and 56 of conventional brakes 58 and 60 operatively connected to ground engaging wheels 61 and 63. The braking force applied by the brakes is a function of the fluid pressure received from the control valve 32, as as is well known.

Power delivered to the drive train from the engine is varied by control element 12 through means of clutch control valve 38. Valve 38 comprises a spool 62 slidable within the valve housing between the positions A-E. Because of the over-center arrangement of link 36 between positions A and B spool 62 remains in its extended position, as illustrated, for the corresponding positions of linkage arm 34 and control element 12. In the positions A, B, and C of spool 62 control valve 38 directs the entire flow of fluid from pump 64 back to reservoir 66 through conduit 68. Between positions C and E of the spool valve 38 directs fluid to clutch 18 with an increasing pressure as a function of spool position.

Clutch 18 is of a modulated or power control clutch having interleaved slip disk construction. The clutch comprises a clutch pack 72 operating responsive to fluid pressure within chamber 74 for gradual engagement and disengagement of power input shaft 76 with output shaft 78. Shaft 78 is connected with the vehicle traction wheels 63 through a torque converter 79 and a forward-reverse and change speed transmission 81. The power delivered to output shaft 78 varies as a function of clutch plate slippage which in turn is determined by fluid pressure within chamber 74, as is well known.

The relationship between brake and clutch pressures as determined by control system 10 is illustrated graphically in FIG. 2. The solid line 80 illustrates variation in brake pressure from control element position A in which full brake pressure is obtained to position C in which the brakes are released. Line 82 illustrates the zero brake pressure condition as control element 12 is moved between positions C-E. The broken line 84 illustrates clutch pressure varying from zero at control element position C to full application pressure at position E. Line 86 similarly illustrates the zero clutch pressure condition for control element positions A-C.

In operation, assuming that the operator has released has foot from control element 12, spring 29 will operate linkage arrangement 14 so that all elements are in their positions indicated at A. This is the control condition which corresponds to the closed throttle or idle position of a conventional vehicle. With full brake pressure and zero clutch pressure the vehicle will be stopped and no power will be delivered to output shaft 78. The engine may now be operated at full governed speed to develop full hydraulic power for operation of the hydraulic actuators, such as the loader mechanism. The operator will next shift the vehicle transmission to a selected gear ratio and then depress control element 12 to achieve the desired vehicle speed. Depending on the road grade, movement of the control element between positions A-C to release the brakes may produce some vehicle movement. Between control element positions C-E the clutch is gradually engaged to achieve the desired vehicle speed. The operator is thus able to achieve a fine degree of vehicle control by modulating brake and clutch pressures with the single control element. To slow the vehicle foot pressure on element 12 is released for gradual disengagement of clutch 18 followed by gradual application of the brakes. Throughout this entire operation a constant engine speed may be maintained.

Control system 10 also is fail-safe in operation. Should the operator become disabled or accidentally thrown from the vehicle spring 12 will automatically return the linkage 14 elements to their positions A so that power to output shaft 78 is interrupted and full braking force is applied. This differs from conventional vehicles having separate brake and clutch controls in which similar operator disability may leave the clutch engaged and the brakes released, thus permitting continued movement of the vehicle.

While the embodiment herein is at present considered to be preferred, it will be understood that numerous variations and modifications may be made by those skilled in the art and it is intended to cover in the appended claims all such variations and modifications as fall within the true spirit and scope of the invention.

What is claimed is:

1. In a rapid-cycle vehicle having at least a pair of wheels on opposite sides of the vehicle, hydraulically actuated brake means on each wheel, a drive train including a forward-reverse transmission from an engine to the wheels, a hydraulically actuated clutch interposed in the drive train between the engine and the transmission, and a source of hydraulic fluid under pressure; the improvement comprising:

a first valve means operatively connected between said source and said brake means, and progressively movable between a fully applied position at source pressure and a released position;

a second valve means operatively connected between said source and said clutch, and progressively movable between a disengaged position and a fully engaged position at source pressure;

a control means movable between an initial position, an intermediate position and a terminal position;

bias means for urging said control means toward its initial position whereby the brake means will be fully applied whenever an operator releases the control means;

the control means being operatively connected to both valve means for moving said first valve means between its applied and released positions only in response to movement of the control means between its initial and intermediate positions and for moving said second valve means between its disengaged and engaged positions only in response to movement of the control means between its intermediate and terminal positions;

whereby the cycle time is maintained at a minimum while minimizing wear on the clutch and brake means.

2. In a vehicle according to claim 1, the improvements further comprising:

foot pedal means capable of being actuated by an operator, and linkage means interconnecting the control means and the foot pedal means.

3. In a wheeled vehicle for performing a multitude of work cycles involving rapid and frequent changes between forward and reverse directions of travel, said vehicle having hydraulically actuated brake means on at least one wheel on each side of the vehicle, a drive train including a forward-reverse transmission from an engine to at least a pair of wheels on opposite sides of the vehicle, a hydraulically actuated clutch means interposed in the drive train between an engine and the transmission, and a source of hydraulic fluid under pressure; the improvement comprising:

a brake valve means operatively connected between said source and said brake means, and progressively movable between a fully applied and released position;

a clutch valve means operatively connected between said source and said clutch, and progressively movable between a disengaged and fully engaged position, a control means operatively connected to both the brake and clutch valve means, and movable sequentially between brake valve actuating positions and clutch valve actuating positions, and bias means urging said control means to position said brake valve means in its fully applied position, whereby the brake means will be fully applied whenever an operator releases said control means.

4. In a wheeled vehicle for performing a multitude of work cycles involving rapid and frequent changes between forward and reverse directions of travel, said vehicle having hydraulically actuated brake means on at least one wheel on each side of the vehicle, a drive train including a forward-reverse transmission from an engine to at least a pair of wheels on opposite sides of the vehicle, a hydraulically actuated clutch means interposed in the drive train between an engine and the transmission, and a source of hydraulic fluid under pressure; the improvement comprising:

a brake valve means operatively connected between said source and said brake means, and progressively movable between a fully applied and released position;

a clutch valve means operatively connected between said source and said clutch, and progressively movable between a disengaged and fully engaged position, a control means operatively connected to both the brake and clutch valve means, and movable sequentially between brake valve actuating positions and clutch valve actuating positions, and bias means urging said control means to position said brake valve means in its fully applied position, whereby the brake means will be fully applied whenever an operator releases said control means.

5. In a rapid-cycle vehicle having at least a pair of wheels on opposite sides of the vehicle, hydraulically actuated brake means on each wheel, a drive train including a forward-reverse transmission from an engine to the wheels, a hydraulically actuated clutch interposed in the drive train between the engine and the pressure; the improvement comprising:

a torque converter in the drive train between said clutch and said transmission;

a first valve means operatively connected between said source and said brake means, and progressively movable between a fully applied position at source pressure and a released position;

a second valve means operatively connected between said source and said clutch, and progressively movable between a disengaged position and a fully engaged position at source pressure;

a control means movable between an initial position, an intermediate position and a terminal position;

bias means for urging said control means toward its initial position whereby the brake means will be fully applied whenever an operator releases the control means;

the control means being operatively connected to both valve means for moving said first valve means between its applied and released positions only in response to movement of the control means between its initial and intermediate positions and for moving said second valve means between its disengaged and engaged positions only in response to movement of the control means between its intermediate and terminal positions;

whereby the cycle time is maintained at a minimum while minimizing wear on the clutch and brake means.

6. In a vehicle according to claim 5, the improvement further comprising:

foot pedal means capable of being actuated by an operator, and linkage means interconnecting the control means and the foot pedal means.

References Cited
UNITED STATES PATENTS

| | | | |
|---|---|---|---|
| 2,433,443 | 12/1947 | Edge | 192—13 A |
| 2,725,890 | 12/1955 | Kanuch | 192—12.1 X |
| 2,941,639 | 6/1960 | Christenson et al. | 192—13 |
| 3,181,667 | 5/1965 | Lohbauer et al. | 192—4 A |
| 3,202,018 | 8/1965 | Hilpert | 192—3.33 X |
| 3,352,392 | 11/1967 | Black et al. | 192—3.5 FP |

BENJAMIN W. WYCHE, Primary Examiner

U.S. Cl. X.R.

192—12 C; 303—19